United States Patent
Tachon

(10) Patent No.: US 10,961,361 B2
(45) Date of Patent: Mar. 30, 2021

(54) CARBON FIBER REINFORCED PLASTIC MATERIAL HAVING HIGH SMOOTHNESS

(71) Applicant: TOYOTA MOTOR EUROPE, Brussels (BE)

(72) Inventor: Julien Tachon, Forest (BE)

(73) Assignee: TOYOTA MOTOR EUROPE, Brussels (BE)

( * ) Notice: Subject to any disclaimer, the term of this patent is extended or adjusted under 35 U.S.C. 154(b) by 349 days.

(21) Appl. No.: 15/779,588

(22) PCT Filed: Jan. 5, 2016

(86) PCT No.: PCT/EP2016/050093
§ 371 (c)(1),
(2) Date: May 29, 2018

(87) PCT Pub. No.: WO2017/118476
PCT Pub. Date: Jul. 13, 2017

(65) Prior Publication Data
US 2020/0299470 A1    Sep. 24, 2020

(51) Int. Cl.
| | |
|---|---|
| *C08J 5/06* | (2006.01) |
| *B29C 43/52* | (2006.01) |
| *C08J 5/24* | (2006.01) |
| *B29C 43/56* | (2006.01) |
| *C08K 3/36* | (2006.01) |
| *C08J 5/04* | (2006.01) |

(Continued)

(52) U.S. Cl.
CPC ............. *C08J 5/042* (2013.01); *B29C 43/003* (2013.01); *B29C 43/52* (2013.01); *C08J 5/06* (2013.01); *C08J 5/24* (2013.01); *B29C 43/56* (2013.01); *B29K 2067/06* (2013.01); *C08J 2367/06* (2013.01); *C08K 3/36* (2013.01); *C08K 2201/005* (2013.01)

(58) Field of Classification Search
CPC ....... B29C 43/003; B29C 43/52; B29C 43/56; C08J 5/06; C08J 5/24; C08J 5/042; C08J 2367/06; C08K 3/36; C08K 2201/005; B29K 2067/06
USPC ........................................................ 524/496
See application file for complete search history.

(56) References Cited

U.S. PATENT DOCUMENTS 5,604,266 A * 2/1997 Mushovic ........... B29C 44/3446
                                                         521/122
2003/0036598 A1    2/2003  Yamasa et al.
(Continued)

FOREIGN PATENT DOCUMENTS

| JP | 61-213225 A | 9/1986 |
|---|---|---|
| JP | 3032582 B2 | 4/2000 |
| JP | 2001-139831 A | 5/2001 |

(Continued)

OTHER PUBLICATIONS

International Search Report of PCT/EP2016/050093 dated Sep. 15, 2016 [PCT/ISA/210].

(Continued)

*Primary Examiner* — William K Cheung
(74) *Attorney, Agent, or Firm* — Sughrue Mion, PLLC

(57) ABSTRACT

A fiber reinforced plastic material is provided. The fiber reinforced plastic material includes a plurality of carbon fibers, and a vinyl ester resin or unsaturated polyester resin containing at least one low coefficient of linear thermal expansion (CLTE) filler.

19 Claims, 2 Drawing Sheets

(51) Int. Cl.
    *B29C 43/00*     (2006.01)
    *B29K 67/00*     (2006.01)

(56)     References Cited

U.S. PATENT DOCUMENTS

| 2007/0173584 A1 | 7/2007 | Twardowska-Baxter et al. |
| 2007/0235698 A1 | 10/2007 | Borade et al. |

FOREIGN PATENT DOCUMENTS

| JP | 2007-131697 A | 5/2007 |
| JP | 2011-56798 A | 3/2011 |
| WO | 2015/113585 A1 | 8/2015 |

OTHER PUBLICATIONS

Written Opinion of PCT/EP2016/050093 dated Sep. 15, 2016 [PCT/ISA/237].
Translation of Notice of Reasons for Rejection for Patent Application JP 2018-535147 dated Jul. 2, 2019.
Communication dated Jun. 28, 2020 from the China National Intellectual Property Administration in Application No. 201680069315.9.

* cited by examiner

CARBON FIBER REINFORCED PLASTIC MATERIAL HAVING HIGH SMOOTHNESS

CROSS REFERENCE TO RELATED APPLICATIONS

This application is a National Stage of International Application No. PCT/EP2016/050093, filed Jan. 5, 2016, the contents of which are incorporated herein by reference in its entirety.

FIELD OF THE DISCLOSURE

The present disclosure is related to a reinforced material and a method for making such a material. More particularly, the present disclosure is related to a carbon fiber reinforced material having high surface smoothness.

BACKGROUND OF THE DISCLOSURE

In many cases plastic materials can be effectively used in place of heavier and more expensive materials such as, for example, steel. However, where such materials are to be used in place of the heavier and more expensive materials, strength and finish may be of particular concern. One example of such a scenario is steel panels used in construction of, for example, automobiles where the surface may be painted and a high gloss without evident patterns is desired.

Carbon fiber reinforced materials offer excellent strength to weight ratios and are well suited to replacing heavier and more expensive materials. However, such carbon fiber reinforced plastic materials have drawbacks when used in areas where an aesthetically pleasing finish is desired. For example, where exemplary steel materials may provide a roughness $R_a$ of approximately 0.15 µm, an exemplary carbon fiber reinforced plastic material may provide a roughness $R_a$ 75% higher, or up to 0.60 µm. This effect is further exacerbated when the material is subsequently finished, e.g., painted and optionally cured.

The surface quality of continuous or chopped carbon fiber reinforced plastic components is poor (e.g. high roughness) because the fiber creates some distortions in the surface smoothness. When these components are painted, the fiber patterns are clearly visible, this is known in the art as "fiber print through."

This phenomenon is caused, at least in part, by the shrinkage of the Thermoset resin surrounding the carbon fibers and/or the carbon fiber bundles during the cooling phase of the molding process. This is known in the art as molding shrinkage.

Additionally, in the case of painted panels, during painting and curing (e.g. at around 140° C.), the thermoset resin expands again, and this expansion is greater than the carbon fibers. When cooling, the resin again shrinks back around the carbon fibers and carbon fiber bundles.

The difference in thermal expansion coefficients between these materials is one of the causes of surface distortion during painting. Both phenomenon mentioned above result in higher roughness and lower finish quality than the commonly used steel materials.

Carbon fiber materials forming panels currently available on the market are thermoset cured materials and they require intensive post-processing to achieve the same wave scan values as steel. Such post-processing can be expensive, time consuming, and labor intensive, and may still not reach the surface quality of steel. Therefore, it would be beneficial to improve still the finish quality while also reducing the resources required to obtain a suitable finish on these materials.

DE 10 2012007839 discloses a multilayer fiber plastic-composite component using a thermoset resin. This composite component has at least one fiber plastic layer made of a matrix resin and a fiber material embedded with carbon fibers. The visible surface is provided with a transparent glass layer, which is connected with the fiber plastic layer by the matrix resin. This material, as noted above, requires extensive post processing to render it useful in applications where an aesthetically pleasing finish is desired.

JP 2010-163536 describes a method for producing a sheet molding compound including drawing out a plurality of carbon fiber bundles from a wound body of a plurality of carbon fiber bundles obtained by winding the plurality of carbon fiber bundles each provided with bundling property on a single bobbin without arranging in parallel, cutting the carbon fiber bundles by a roving cutter and simultaneously dividing the carbon fiber bundles for each fiber bundle, mixing the cut carbon fiber bundles with a resin composition and sheeting the mixture.

WO 2015/113585 discloses a fiber reinforced plastic material including a fiber layer comprising a plurality of continuous carbon fiber reinforced thermoplastic sheets, a veil layer comprising fibers selected from at least one of glass fiber and carbon fiber, and a resin layer comprising a resin film, wherein the veil layer is impregnated by at least a portion of the resin film.

SUMMARY OF THE INVENTION

The inventors have recognized that it is desirable to improve the smoothness of fiber reinforced plastic sheets. Embodiments of the present disclosure are intended to overcome the shortcomings in the current state-of-the-art recognized by the inventors.

According to embodiments of the present disclosure, a fiber reinforced plastic material is provided, including a plurality of carbon fibers and a vinyl ester resin or unsaturated polyester resin and at least one low coefficient of linear thermal expansion (CLTE) filler.

By providing such a material, varying rates of shrinkage due to differing coefficients of thermal expansion between a resin and a fiber layer may be reduced such that fiber-print-through is reduced or even eliminated.

According to some embodiments, the at least one low CLTE filler may be selected from fused silica and feldspar.

The carbon fiber reinforced thermoset sheets may be chopped carbon fiber ranging from 10 to 50 mm, preferably 25 mm.

The plurality of carbon fibers may be randomly dispersed in the resin.

The filler may be present in the resin in a range of between 10 and 40 percent by volume of the fiber reinforced plastic material.

The carbon fiber may be present in a range of between 15 and 60 percent by volume of the fiber reinforced plastic material.

The plurality of fibers are embedded at least partially in the resin.

At least one surface of the fiber reinforced plastic material may have a surface roughness less than 0.38 µm, and preferably less than 0.20 µm, surface roughness being measured by a profilometer, for example, a Mitutoyo SV-3000CNC.

The fiber reinforced plastic material may have a finish layer and the finish layer may be a paint.

Particles of the filler may have an average particle size of between 0.5 and 4 μm, preferably between 2 and 3 μm. Additionally, Coefficients of linear thermal expansion of the fillers may range from 0.5 to $4.5 \times 10^{-6}/C°$.

According to embodiments of the present disclosure, a method of molding a fiber reinforced plastic material is provided. The method includes providing a fiber reinforced plastic material according to any of embodiments discussed above to a compression molding tool configured to apply a tool pressure to the fiber reinforced plastic material, compression molding the fiber reinforced plastic material in the compression molding tool at a first molding tool temperature, and cooling the compression molded fiber reinforced plastic material to a second molding tool temperature while maintaining or increasing the tool pressure on the fiber reinforced plastic material.

The tool pressure may ranges between 2 and 15 MPa during the compression molding step, while the first molding tool temperature may range between 120 degrees C. and 160 degrees C.

The tool pressure may be maintained at a first pressure between 9 and 14 MPa for a first time period, for example, 20 seconds. After the first time period (e.g., during the cooling step and/or during a second time period of the compression molding step) the molding tool pressure may be increased to a second pressure between 18 and 22 MPa and maintained at the second pressure over a time period of between 70 and 100 seconds. In addition, the second pressure may be maintained until the molding tool has cooled to the second molding tool temperature, e.g., ambient temperature.

The second molding tool temperature may range between 40 and 60 degrees C., preferably 50 degrees C.

During the cooling step, the molding tool may be cooled based on ambient conditions. Alternatively, cooling may be facilitated by, for example, a cooling circuit.

According to some embodiments, the method may include removing the fiber reinforced plastic material from the compression molding tool when the molding tool temperature reaches the second molding tool temperature.

In addition, a step of applying a finish layer to the fiber reinforced plastic material following the cooling step may be carried out.

The finish layer may include a paint.

The finish layer may be cured during a curing step.

Additional objects and advantages of the invention will be set forth in part in the description which follows, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the disclosure.

DESCRIPTION OF THE EMBODIMENTS

Reference will now be made in detail to the present exemplary embodiments of the disclosure, examples of which are illustrated in the accompanying drawings. Wherever possible, the same reference numbers will be used throughout the drawings to refer to the same or like parts.

Figure 1:
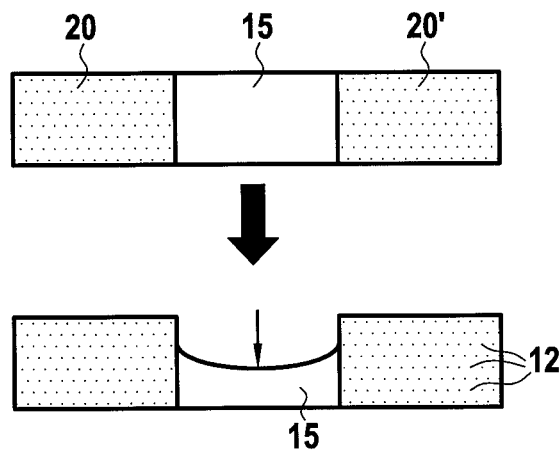
FIG. 1 is a schematic depiction showing a sheet of carbon fiber reinforced plastic material at 150° C. inside the tool and after demolding.

FIG. 1 is a schematic depiction showing a resin rich (15) area and a carbon fiber rich area (20 & 20') at 150° C. in the mold according to embodiments of the present disclosure. Commercially available products include Toray T700SC-12000F0E, for example. Such carbon fibers may be chopped carbon fibers.

When the carbon fibers are cut fibers, the fibers may have a maximum length not greater than 50 mm, and preferably not greater than 25 mm.

Carbon fibers 12 may be present in a range of between 15 and 60 percent by volume of the carbon fiber reinforced plastic material, for example, preferably at 30 percent by volume of the layer.

In addition to the carbon fibers 12 and/or carbon fiber bundles (not shown), a resin 15, which may be a vinyl ester resin or an unsaturated polyester resin, is provided into which the carbon fibers are embedded. Resin 15 may be present in an amount, for example, of 20-80 percent by volume of the layer, and preferably 50 percent by volume of the layer.

Resin 15 may be mixed with low CLTE fillers, for example feldspar and/or fused silica. Coefficients of linear thermal expansion of the fillers may range from 0.5 to $4.5 \times 10^{-6}/C°$, for example.

The fillers may be present in the resin in a range of between 10 and 40 percent by volume of the fiber reinforced plastic material, for example, preferably 20 percent by volume of the fiber reinforced plastic material. Particles of the low CLTE fillers may have an average particle size of between 1 and 4 μm, preferably between 2 and 3 μm.

In addition to fillers mentioned herein, additional components may be present in vinyl ester resin 15. For example, vinyl ester resin 15 may include styrene, wetting additives (e.g., BYK 9076), processing additives (e.g., BYK 9085), low-density polyethylene (LDPE) (e.g., Coathylene HA 1681), peroxide (e.g., Trigonox 117), MgO (e.g., Luvatol EK 100KM), etc. Such additional components may be present in varying percentages based on the presence of the previously discussed fillers and vinyl ester resin.

The above described materials may be compression molded following their assembly and then optionally finished (e.g., painted) with a paint layer (not shown) for example. The finish layer may then be cured as desired.

Figure 2B:
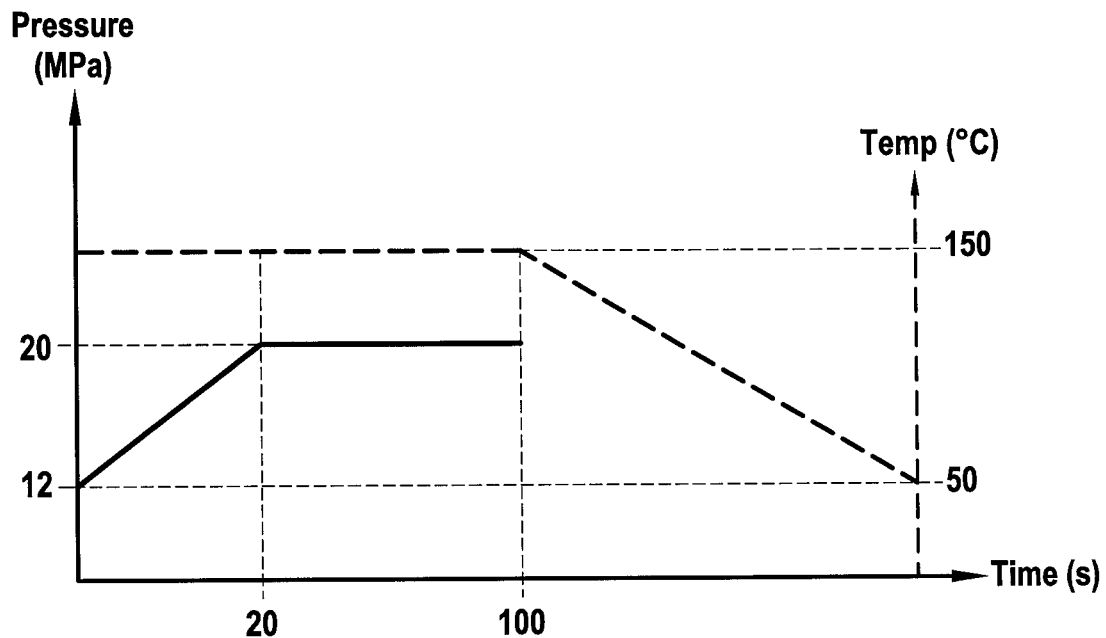
FIG. 2B is a time chart showing a compression molding technique according to embodiments of the present disclosure.
Figure 3:
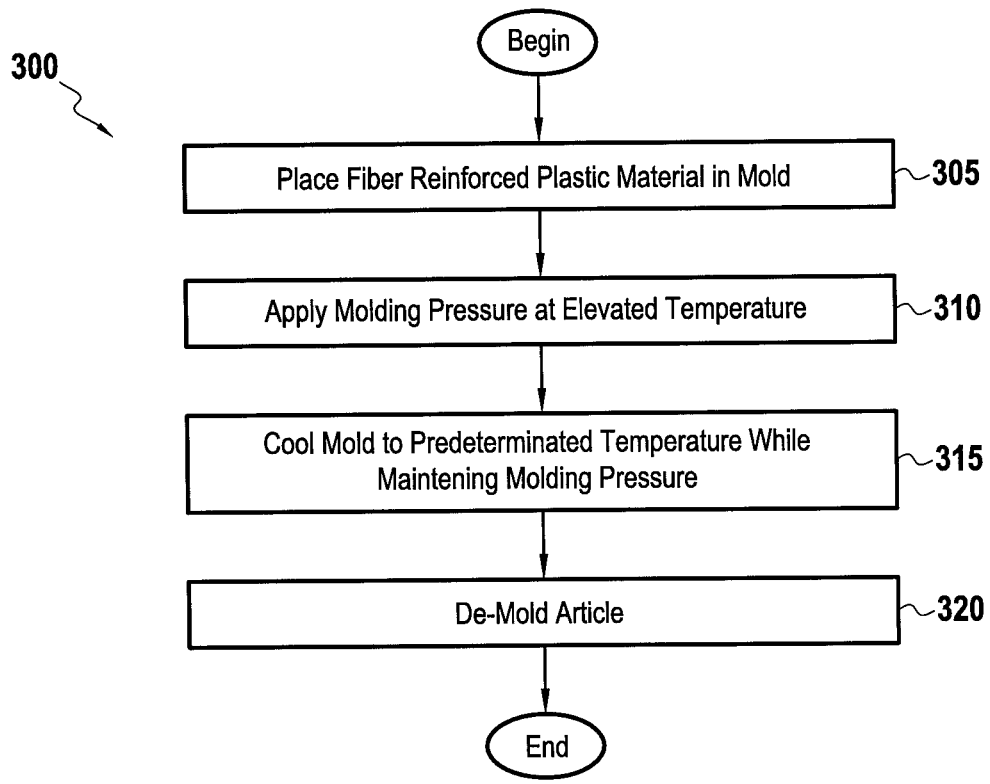
FIG. 3 is a flowchart for describing an exemplary compression molding method according to embodiments of the present disclosure.

FIG. 3 is a flowchart describing a compression molding method according to embodiments of the present disclosure. The time chart of FIG. 2B may be viewed in conjunction with FIG. 3 for better understanding.

Reinforcement carbon fibers may be cut to desired length and mixed with resin 15. Alternatively, carbon fibers may be obtained pre-cut for facilitating use. According to some embodiments, one or more carrier films may be used to retain a suitable amount of resin 15, while cut carbon fibers are applied to resin 15 present on the carrier film in an amount previously specified above in relation to the amount of resin 15. The carrier film, resin, and carbon fibers may then pass through a compaction device configured compress the carbon fibers into the resin on the carrier sheet. One or more subsequent carrier sheets may then be applied to the as-formed carbon fiber reinforced material. One of skill in the art will recognize that other suitable techniques for forming the fiber reinforced material may be used, for example, a carrier sheet may be applied to the carbon fiber/resin material before passing through a compaction device. Alternative, no compaction device may be used and the carbon fibers may be mixed into the resin.

The material thus-formed may be assembled according to manufacturing specifications for a particular panel and placed in a compression molding tool (step 305).

Once the material has been positioned, the compression molding tool is closed and a molding pressure applied at an elevated temperature (step 310). For example, the molding tool pressure may range between 2 and 15 MPa during compression molding (e.g., a first time period of the compression molding), while a first temperature (i.e., the temperature at which the compression molding tool is raised so as to begin compression molding) ranges between 120 degrees C. and 160 degrees C., for example 150 degrees C.

Figure 2A:
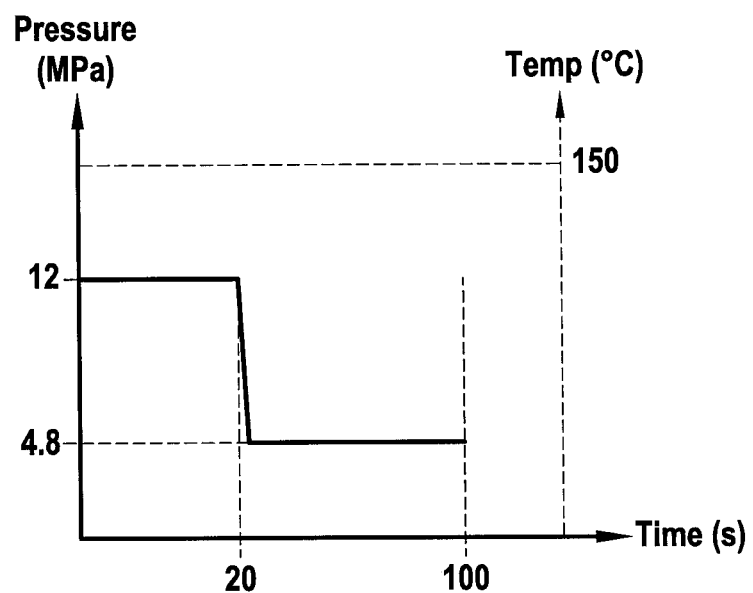
FIG. 2A is a time chart showing an exemplary prior art compression molding technique.

According to some embodiments, the compression molding tool pressure may be applied at a first pressure between 9 and 14 MPa over a first time period of 20 seconds. After the first time period, the molding tool pressure may be increased to the second pressure between 18 and 22 MPa and held at the second pressure over a second time period of between 70 and 100 seconds during the molding. For example, at a time when compression molding begins, a molding tool pressure may be set at 12 MPa and then increased to 20 MPa at 20 seconds as shown at FIG. 2. During this time, a molding tool temperature may be held constant at 150 degrees C. The molding tool pressure may then be held at 20 MPa over 80 seconds with the temperature maintained at 150 degrees C.

The compression molding tool and the fiber reinforced plastic article therein may then be cooled to a predetermined temperature while the second molding pressure is maintained on the sheet (step 315). For example, the molding tool may be allowed to cool based on ambient conditions to between about 40 and 60 degrees C., preferably 50 degrees C. During this cooling time, the molding tool pressure may be maintained at 20 MPa. On of skill in the art will understand that molding tool pressure may also be gradually reduced over time, for example, from 20 MPa to 12 MPa over a cooling time of 100 seconds.

Once the molding tool has reached the predetermined temperature (e.g., 50 degrees C.) the article, which has been molded, may be de-molded and removed (step 320).

Following the compression molding, the article may be optionally finished, for example, painted and cured, as desired.

The following non-limiting examples in which an average carbon fiber length of 25 mm was used, are provided in order to aid in carrying out the presently disclosed invention.

Example 1—Comparative Example

A conventional material lay-up referred to as a panel having carbon fiber present at a rate of 30 percent by volume of the carbon fiber reinforced plastic material.

A vinyl ester resin without any fillers was prepared according to the following table.

| Trade name | Component | % (by resin volume) |
| --- | --- | --- |
| Atlac XP810X | Vinyl Ester Resin | 92.5 |
| Palapreg H 2681-01 | Low profile additive | 7.5 |

The Palapreg H 2681-01 contained fractions of styrene, wetting additives, processing additives, LDPE, peroxide, and MgO.

The panel was coated with the vinyl ester resin and was subsequently compression molded at a temperature of 150 degrees at 12 MPa for 20 seconds, with a decrease in pressure to 4.8 MPa for 80 seconds. The mold was then opened, the panel de-molded and allowed to cool.

The produced panel was then measured with a Mitutoyo SV-3000CNC profilometer device to determine surface roughness of the top surface, with filter cutoff levels of the profilometer device set at two different values for two separate measurements, the cutoff levels being 0.8 mm and then at 2.5 mm and the results recorded. See Table 2.

Example 2—Resin with Filler

In this example, the panel was initially prepared as was done for comparative example 1. That is, A conventional material lay-up referred to as a panel having carbon fiber present at a rate of 30 percent by volume of the carbon fiber reinforced plastic material.

Following this preparation, a vinyl resin was prepared similarly to the comparative example, but inducing 16 percent by volume of CaCO3 as a filler (CLTE: $10 \times 10^{-6}$/C°, Particle size (D50): 3 um)

The panel was compression molded at a temperature of 150 degrees at 12 MPa for 20 seconds, with a decrease in pressure to 4.8 MPa for 80 seconds. The mold was then opened, the panel de-molded and allowed to cool.

The produced panel was then measured with a Mitutoyo SV-3000CNC profilometer device to determine surface roughness of the top surface, with filter cutoff levels of the profilometer device set at two different values for two separate measurements, the cutoff levels being 0.8 mm and then at 2.5 mm, and the results recorded. See Table 2.

Roughness values were improved over the comparative example, but were not better than steel.

Example 3—Resin with Low CLTE Filler Feldsar

In this example, the panel was again prepared as was done for comparative example 1. That is, A conventional material lay-up referred to as a panel having carbon fiber present at a rate of 30 percent by volume of the carbon fiber reinforced plastic material.

Following this preparation, a vinyl resin was prepared similarly to the comparative example, but including 16 percent by volume of a low CLTE filler, in this example, feldspar. (CLTE: $4.2 \times 10^{-6}$/C°, Particle size (D50): 3 um)

The panel was coated with the vinyl ester resin and was subsequently compression molded at a temperature of 150 degrees at 12 MPa for 20 seconds, with a decrease in pressure to 4.8 MPa for 80 seconds. The mold was then opened, the panel de-molded and allowed to cool.

The produced panel was then measured with a Mitutoyo SV-3000CNC profilometer device to determine surface roughness of the top surface, with filter cutoff levels of the profilometer device set at two different values for two separate measurements, the cutoff levels being 0.8 mm and then at 2.5 mm, and the results recorded. See Table 2.

Roughness values were improved over the comparative example, and at cut off value $L_c$ of 0.8 mm, was able to meet that of steel, but the longer cut off value $L_c$ of 2.5 mm could not.

Example 4—Resin with Low CLTE Filler Fused Silica

In this example, the panel was again prepared as was done for comparative example 1. That is, A conventional material lay-up referred to as a panel having carbon fiber present at a rate of 30 percent by volume of the carbon fiber reinforced plastic material.

Following this preparation, a vinyl resin was prepared similarly to the comparative example, but including 16 percent by volume of a low CLTE filler, in this example, fused silica having a Coefficient of Linear Thermal Expansion of 0.5, particle size 4 um.

The panel was coated with the vinyl ester resin and was subsequently compression molded at a temperature of 150 degrees at 12 MPa for 20 seconds, with a decrease in pressure to 4.8 MPa for 80 seconds. The mold was then opened, the panel de-molded and allowed to cool.

The produced panel was then measured with a Mitutoyo SV-3000CNC profilometer device to determine surface roughness of the top surface, with filter cutoff levels of the profilometer device set at two different values for two separate measurements, the cutoff levels being 0.8 mm and then at 2.5 mm, and the results recorded. See Table 2.

Roughness values were similar to Example 3 for both cut off values $L_c$ of 0.8 mm and 2.5 mm. However, the molded panel was substantially lighter weight.

Example 5—Resin with Low CLTE Filler Fused Silica—Modified Molding and Cooling Process In this example, the panel was again prepared as was done for comparative example 1. That is, A conventional material lay-up referred to as a panel having carbon fiber present at a rate of 30 percent by volume of the carbon fiber reinforced plastic material.

Following this preparation, a vinyl resin was prepared similarly to the comparative example, but including 21 percent by volume of a low CLTE filler, in this example, fused silica.

The panel was coated with the vinyl ester resin and was subsequently compression molded at a temperature of 150 degrees at 12 MPa for 20 seconds, with an increase in pressure to 20 MPa for 80 seconds.

The molding tool was then left at ambient conditions without further application of heat, but with the pressure maintained at 20 MPa. This was done until the temperature of the molding tool reached 50 degrees C. The mold was then opened, the panel de-molded and allowed to further cool.

The produced panel was then measured with a Mitutoyo SV-3000CNC profilometer device to determine surface roughness of the top surface, with filter cutoff levels of the profilometer device set at two different values for two separate measurements, the cutoff levels being 0.8 mm and then at 2.5 mm, and the results recorded. See Table 2.

Roughness values were for this example for both cut off values $L_c$ of 0.8 mm and 2.5 mm were able to reach and even exceed those of steel.

Example 5'—Resin with Low CLTE Filler Fused Silica 21%

In this example, the panel was again prepared as was done for comparative example 1. That is, a conventional material lay-up referred to as a panel having carbon fiber present at a rate of 30 percent by volume of the carbon fiber reinforced plastic material.

Following this preparation, a vinyl resin was prepared similarly to the comparative example, but including 21 percent by volume of a low CLTE filler, in this example, fused silica.

The panel was coated with the vinyl ester resin and was subsequently compression molded at a temperature of 150 degrees at 12 MPa for 20 seconds, with an increase in pressure to 20 MPa for 80 seconds.

The mold was then opened, the panel de-molded and allowed to cool.

Table 2 shows the results of the six examples as well as reference information for a steel panel.

TABLE 2

| | | | Surface Roughness $R_z$ | |
|---|---|---|---|---|
| Ref. Steel | Resin | Filler % by Vol | 0.16 $L_c$ = 0.8 mm | 0.16 $L_c$ = 2.5 mm |
| Comp. Ex. | Vinyl Ester No Filler | N/A | 0.25 | 0.54 |
| Ex. 2 | Vinyl Ester CaCO3 | 16 | 0.20 | 0.38 |
| Ex. 3 | Vinyl Ester Feldspar | 16 | 0.12 | 0.25 |
| Ex. 4 | Vinyl Ester Fused Silica | 16 | 0.12 | 0.25 |
| Ex. 5' | Vinyl Ester Fused Silica | 21 | 0.15 | 0.23 |
| Ex. 5 | Vinyl Ester Fused Silica | 21 | 0.11 | 0.15 |

Although the present disclosure herein has been described with reference to particular embodiments and examples, it is to be understood that these embodiments and examples are merely illustrative of the principles and applications of the present disclosure.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Additionally, even though some features, concepts or aspects of the inventions may be described herein as being a preferred arrangement, selection, or method, such description is not intended to suggest that such feature is required or necessary unless expressly so stated.

It is intended that the specification and examples be considered as exemplary only, with a true scope of the disclosure being indicated by the following claims.

The invention claimed is:

1. A fiber reinforced plastic material, comprising:
   a plurality of carbon fibers; and
   a vinyl ester resin or unsaturated polyester resin containing at least one low coefficient of linear thermal expansion (CLTE) filler, wherein the plurality of carbon fibers are present in a range of between 15 and 60 percent by volume of the fiber reinforced plastic material.

2. The fiber reinforced plastic material according to claim 1, wherein the at least one low CLTE filler is selected from fused silica and feldspar.

3. The fiber reinforced plastic material according to claim 1, wherein the carbon fibers are chopped carbon fibers.

4. The fiber reinforced plastic material according to claim 1, wherein the filler is present in the resin in a range of between 10 and 40 percent by volume of the fiber reinforced plastic material.

5. The fiber reinforced plastic material according to claim 1, wherein the plurality of carbon fibers are impregnated by the resin.

6. A fiber reinforced plastic material, comprising:
   a plurality of carbon fibers; and
   a vinyl ester resin or unsaturated polyester resin containing at least one low coefficient of linear thermal expansion (CLTE) filler, wherein the plurality of carbon fibers have a maximum length not greater than 50 mm.

7. The fiber reinforced plastic material according to claim 6, wherein at least one surface of the fiber reinforced plastic material has a surface roughness less than 0.38 μm surface roughness being measured by a profilometer.

8. The fiber reinforced plastic material according to claim 1, further comprising a finish layer.

9. The fiber reinforced plastic material according to claim 8, wherein the finish layer comprises a paint.

10. The fiber reinforced plastic material according to claim 1, wherein particles of the filler have an average particle size of between 1 and 4 μm.

11. A method of molding a fiber reinforced plastic material, the method comprising:
    providing a fiber reinforced plastic material to a compression molding tool configured to apply a tool pressure to the fiber reinforced plastic material;
    compression molding the fiber reinforced plastic material in the compression molding tool at a first molding tool temperature; and
    cooling the compression molded fiber reinforced plastic material to a second molding tool temperature while maintaining or increasing the tool pressure on the fiber reinforced plastic material,
    wherein the fiber reinforced plastic material comprises a plurality of carbon fibers; and a vinyl ester resin or unsaturated polyester resin containing at least one low coefficient of linear thermal expansion (CTLE) filler.

12. The method according to claim 11, wherein the tool pressure ranges between 2 and 15 MPa during the compression molding step, while the first molding tool temperature ranges between 130 degrees C. and 160 degrees C.

13. The method according to claim 11, wherein the tool pressure is held at a first pressure between 9 and 14 MPa, over a first time period of 20 seconds.

14. The method of claim 13, wherein the tool pressure is increased to the second pressure after the first time period, and held at the second pressure over a second time period until the molding tool has reached the second temperature.

15. The method according to claim 11, wherein the second molding tool temperature ranges between 40 and 60 degrees C.

16. The method according to claim 11, wherein during the cooling step, the molding tool is cooled based on ambient conditions.

17. The method according to claim 11, comprising removing the fiber reinforced plastic material from the compression molding tool when the molding tool temperature reaches the second molding tool temperature.

18. The method according to claim 11, comprising applying a finish layer to the fiber reinforced plastic material following the cooling step.

19. The method according to claim 18, further comprising curing the finish layer.

* * * * *